United States Patent [19]

Marechal

[11] 3,796,504

[45] Mar. 12, 1974

[54] DEVICE FOR FASTENING A CABLE TO A CONNECTOR HANDLE

[76] Inventor: Gilles Adrien Georges Marechal, 36 Quai De Bethune, Paris, France

[22] Filed: Mar. 6, 1972

[21] Appl. No.: 232,138

[30] Foreign Application Priority Data

Mar. 16, 1971 France .............................. 71.09118

[52] U.S. Cl. ................ 403/288, 403/290, 403/366, 339/103 R
[51] Int. Cl. ............................................. F16b 2/10
[58] Field of Search . 339/58, 103 R, 103 M, 103 C; 174/46; 287/116, 20 R; 285/145, 322, 323; 279/42, 48, 50, 49; 403/288, 290, 366

[56] References Cited
UNITED STATES PATENTS

| 2,076,072 | 4/1937 | Douglas | 339/103 R |
| 3,430,187 | 2/1969 | De Man et al. | 339/103 R |
| 1,372,288 | 3/1921 | Hellerstedt | 339/103 R |
| 1,977,224 | 10/1934 | Albertson | 339/58 |

FOREIGN PATENTS OR APPLICATIONS

| 534,772 | 3/1941 | Great Britain | 285/356 |
| 1,382,489 | 11/1964 | France | 285/323 |
| 599,646 | 10/1925 | France | 285/323 |

Primary Examiner—Andrew V. Kundrat
Attorney, Agent, or Firm—Edwin E. Greigg

[57] ABSTRACT

The device comprises a clamping member formed by an annular collar of plastic material which is intended to rest on a bearing surface of the handle with interposition of a shouldered tubular seal in intimate contact with the cable. Jaws integral with the collar and extending vertically upwards therefrom in radial planes cooperate with an internal frusto-conical bearing surface of the connector cap. When the cap is screwed-down onto the handle, the jaws produce a powerful clamping action on the cable.

4 Claims, 5 Drawing Figures

PATENTED MAR 12 1974 3,796,504
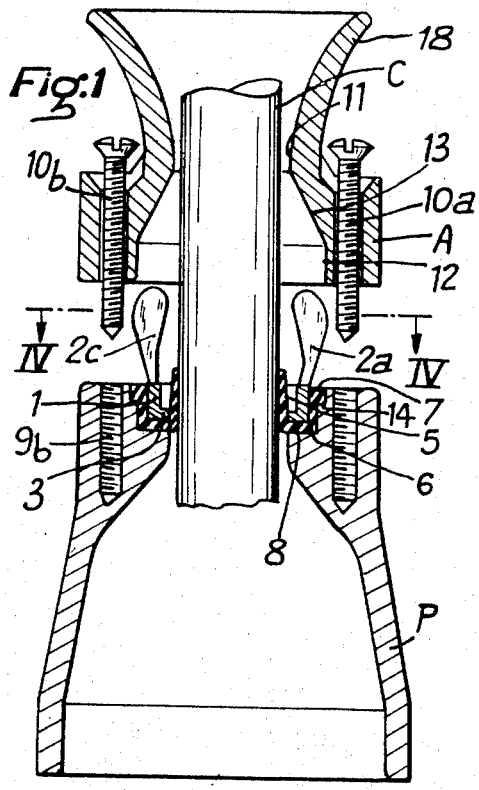
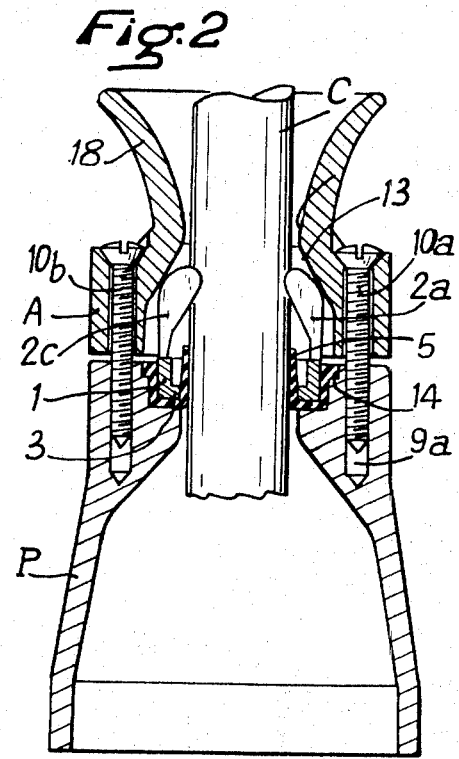
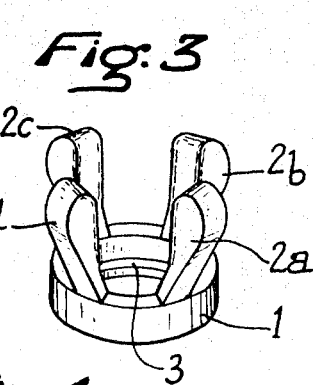
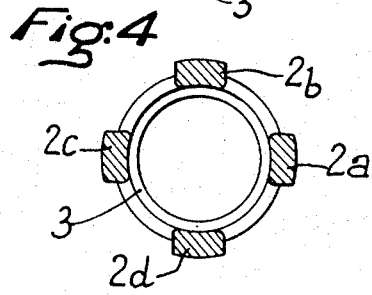
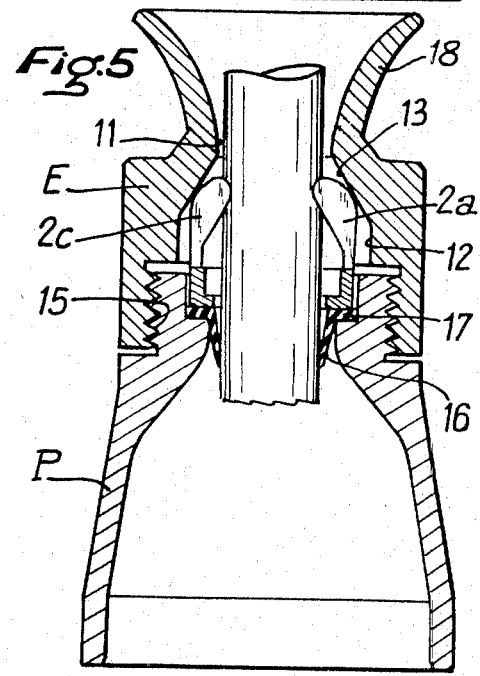

DEVICE FOR FASTENING A CABLE TO A CONNECTOR HANDLE

The various fastening systems at present in use for securing an electric cable to the handle of a connector, whether they are of the type comprising two half-clips which are placed either outside or inside the handle and apply pressure on the cable or of the so-called "cable gland" type, do not prove wholly satisfactory. When systems of the first type are located on the exterior, the clamping screws form projections which are liable to injure the operator; and when they are placed within the interior of the handle, it is consequently necessary to disassemble this latter in order to check the effectiveness of the clamping, thus entailing a loss of time. So far as the second type is concerned, the degree of compression produced by such systems is never sufficient to ensure effective clamping.

The fastening device in accordance with the invention circumvents these disadvantages and is so arranged that the positioning of the cover on the handle is sufficient to afford satisfactory clamping.

The device in accordance with the invention for fastening a cable to a connector handle essentially comprises a clamping member formed on the one hand by an annular collar of plastic material which is intended to rest on a bearing surface of the handle with interposition of a shouldered tubular seal closely applied against the periphery of the cable and, on the other hand, a plurality of jaws forming one piece with said annular collar and extending vertically upwards therefrom in radial planes and adapted to cooperate with an internnal frusto-conical bearing surface provided in the connector cap in such manner as to ensure that the jaws produce a powerful clamping action on the cable at the time of fixing of the cap on the handle.

In accordance with a further property of the invention, said jaws are divergent from the annular collar and have a cross-section at right angles to the axis which is initially relatively small at the roots of the jaws and progressively increases to the vicinity of the upper extremities thereof.

A better understanding of the invention will be gained from the accompanying drawings, wherein:

FIG. 1 is a diametral sectional view of a connector handle fitted with a fastening device in accordance with the invention, in which the connector cap is not clamped against the handle;

FIG. 2 is a similar view in which the connector cap is shown in the clamped position;

FIG. 3 is a view in perspective showing the clamping member;

FIG. 4 is a sectional view taken along line IV—IV of FIG. 1;

FIG. 5 is a diametral sectional view of an alternative embodiment in which clamping is effected by means of an internally-threaded cap.

In FIGS. 1 to 4, the reference P designates the connector handle and the reference A designates the connector cap which is intended to be fixed on the end of the handle by screwing into two diametrically-opposite and internally threaded holes 9a, 9b, two screws 10a, 10b which pass through corresponding holes formed in the connector cap. Said cap has two cylindrical end bores 11 and 12 joined together by a frusto-conical bearing surface 13, the bore 11 being slightly larger in diameter than the cable and being surmounted by a flared horn 18 which is intended to prevent any damage to the cable when this latter is displaced from the axis.

The handle P is provided at its extremity with two annular shoulders 6 and 14 for accommodating the edge of a tubular seal 5 which is closely applied against the periphery of the cable, said edge being folded-back in the shape of an annular trough.

The clamping member in accordance with the invention is shown in perspective in FIG. 3; it comprises a cylindrical collar 1 having a bottom internal annular flange 3 and is provided on its opposite end face with four divergent jaws 2a to 2d which are located in pairs on orthogonal planes of symmetry. As the cross-section of each jaw at right angles to the axis increases progressively from the jaw root to the vicinity of the rounded jaw extremity, the most distant portions of the outer faces of two opposite jaws are located at a distance from each other which is slightly shorter than the diameter of the cylindrical bearing surface 12 of the connector cap.

The base of said clamping member is inserted in the annular trough of the seal 5 as shown in FIG. 2.

By tightening the screws 10a, 10b hard up, the frusto-conical bearing surface 13 of the connector cap has the resultant effect on the one hand of thrusting the inner extremities of the jaws 2a to 2d into the sheath of the cable C which is thus suitably fastened and, on the other hand, of closely applying the bottom of the annular trough which forms an extension of the tubular seal and the annular flange of the edge of the trough against the shoulders 6 and 14 of the handle.

In the alternative embodiment which is illustrated in FIG. 5, the handle P terminates in an external screw-thread 15 on which a nut E is intended to be engaged by screwing, said nut being provided in the same manner as the cap A with two cylindrical end bearing surfaces 11 and 12 and an intermediate frusto-conical bearing surface 13. The frusto-conical seal 16 with annular flange 17 has a terminal opening which is slightly smaller than the transverse cross-section of the cable in such manner as to permit its penetration by elastic deformation and thus to achieve a very high standard of fluid-tightness.

It is worthy of mention that the seal can be combined with the base of the clamping member by extending the annular flange 3 towards the center and making provision for a progressive reduction in thickness of said flange up to a distance from the axis which is slightly shorter than the radius of the cable. Penetration of the cable by elastic deformation of the annular flange ensures satisfactory fluid-tightness.

Whatever embodiment may be adopted, particular emphasis should be laid on the fact that the cable is subjected to a powerful clamping action without any attendant risk of damage to its insulating sheath and that the slight longitudinal elastic deformation of the clamping member as well as the elastic flattening of the annular flange of the seal produce a longitudinal thrust which tends to separate the cap A or the nut E from the connector P. The result thereby achieved at the time of assembly of these elements is to produce a resilient locking action which prevents any accidental slackening-off. Fluid-tightness is ensured in a simple and convenient manner. Finally, beyond the clamping point and towards the exterior, the cylindrical portion 11 of the cap or of the nut and the horn 18 limit the possible curvature of the cable and prevent fracture of this latter at the level of clamping. All these features combined with ease of assembly of the device consitute a substantial technical improvement over all comparable devices of the prior art.

I claim:

1. A device for fastening a cable to a connector handle including an annular shoulder, the device essentially comprising a connector cap and a clamping member formed, on the one hand, by an annular collar of plastic material which is intended to rest on a bearing surface of the handle with interposition of a shouldered tubular seal closely applied against the periphery of said cable and, on the other hand, by a plurality of jaws forming one piece with said annular collar and extending vertically upwards therefrom in radial planes, said tubular seal including a terminal annular trough within which said collar is inserted thereby maintaining said tubular seal tightly applied against said annular shoulder, and said jaws being adapted to cooperate with an internal frusto-conical bearing surface provided in the connector cap in such a manner as to ensure that said jaws produce a powerful clamping action on the cable at the time of fixing said cap on said handle.

2. A cable-fastening device according to claim 1, wherein the jaws are divergent from the annular collar and have a cross-section at right angles to the axis which is initially relatively small at the roots of said jaws and progressively increases to the vicinity of the upper extremities thereof.

3. A cable-fastening device according to claim 1, wherein the tubular seal has the shape of a cone frustum provided with an annular flange on the large base thereof.

4. A device for fastening a cable to a connector handle, essentially comprising a connector cap, and a clamping member formed, on the one hand, by an annular collar of plastic material which is intended to rest on a bearing surface of the handle with interposition of a shouldered tubular seal closely applied against the periphery of said cable and, on the other hand, by a plurality of jaws forming one piece with said annular collar and extending vertically upwards therefrom in radial planes and adapted to cooperate with an internal frusto-conical bearing surface provided in the connector cap in such a manner as to ensure that said jaws produce a powerful clamping action on the cable at the time of fixing said cap on said handle, said seal being constituted by an internal annular flange of the clamping member which is of progressively decreasing thickness in the direction of the axis and through which the cable is passed as a result of elastic deformation of said flange.

* * * * *